US005346573A

United States Patent [19]

Blumberg et al.

[11] Patent Number: 5,346,573

[45] Date of Patent: Sep. 13, 1994

[54] METHOD OF MANUFACTURING A PAPER BINDER

[75] Inventors: Murray B. Blumberg, Sandton, South Africa; William M. Hoffman, Hamilton, Ohio

[73] Assignee: Technokantoor Limited, Brussels, Belgium

[21] Appl. No.: 100,986

[22] Filed: Aug. 3, 1993

Related U.S. Application Data

[62] Division of Ser. No. 3,464, Jan. 12, 1993, Pat. No. 5,292,204.

[51] Int. Cl.[5] .............................................. B32B 31/00

[52] U.S. Cl. .................................... 156/256; 156/300; 156/303.1

[58] Field of Search ..................... 156/297, 300, 303.1, 156/256, 257, 60; 24/67 PR, 67 R, 93, 96, 703.2, 703.6, 901; 402/8, 12, 14, 58, 59

[56] References Cited

U.S. PATENT DOCUMENTS

| | | | |
|---|---|---|---|
| 286,143 | 10/1883 | McGill | 24/703.6 |
| 337,182 | 3/1886 | McGill | 24/96 |
| 512,620 | 1/1894 | McGill | 24/703.6 |
| 512,621 | 1/1894 | McGill . | |
| 859,934 | 7/1907 | Freschl | 24/703.6 |
| 1,178,738 | 4/1916 | Lichter | 24/96 |
| 1,538,314 | 5/1925 | Dooner . | |
| 1,811,713 | 6/1931 | Broome | 24/703.6 |
| 2,480,323 | 8/1949 | Derman . | |
| 2,578,923 | 12/1951 | Crary . | |

*Primary Examiner*—Michael W. Ball
*Assistant Examiner*—Richard Crispino
*Attorney, Agent, or Firm*—Wood, Herron & Evans

[57] ABSTRACT

A paper binder comprises a pair of prongs, an anchor formation at one end of each prong, and a head, the anchor formations being embedded in the head. The invention extends to a method of manufacturing a paper binder, which includes the steps of providing two thin head forming elements that are capable of being bonded together, forming an aperture in one of the elements, inserting a binding member into the aperture, the binding member having a pair of prongs with anchor formations and bonding the elements together, the anchor formations sandwiched therebetween and the prongs extending therefrom. The invention extends further to an apparatus for manufacturing a paper binder which includes an inserting means for inserting the binding member into an aperture in a base element and a bonding means for bonding a cover element to the base element with an anchor formation sandwiched therebetween.

9 Claims, 3 Drawing Sheets

METHOD OF MANUFACTURING A PAPER BINDER

This is a division of patent application Ser. No. 08/003,464, filed Jan. 12, 1993, now U.S. Pat. No. 5,292,204.

FIELD OF THE INVENTION

THIS INVENTION relates to a paper binder and to a method and apparatus for manufacturing it.

SUMMARY OF THE INVENTION

Paper binders, comprising a metal head from which extends two metal prongs are generally known and used. These paper binders have a major disadvantage in that the metal heads tend to scratch and damage exposed surfaces such as desk tops. In an attempt to obviate this, the metal heads of the binders have been dished. However, this proposal has not been too successful. Also, in an attempt to obviate the problem the heads of the binders have been formed to have an inwardly directed lip formation so that there are no sharp edges. This has successfully overcome the problem but is an expensive solution as complicated and expensive machinery is required to manufacture such binders.

It is an object of the invention to provide a paper binder with a head that does not scratch or damage exposed surfaces and can be manufactured in a relatively cheap and simple manner with machinery that is relatively uncomplicated.

In accordance with the invention there is provided a paper binder which comprises a pair of prongs;

an anchor formation at one end of each prong; and a head, the anchor formations being embedded in the head.

The head may conveniently comprise two thin disc-like elements with the anchor formations sandwiched therebetween. One of these elements may have an aperture therein through which the prongs extend.

The elements may be circular, oval, square, or have any other suitable shape.

Further according to the invention there is provided a method of manufacturing a paper binder, which includes the steps of:

providing two thin head forming elements that are capable of being bonded together;

forming an aperture in one of the elements;

inserting a binding member into the aperture, the member having a pair of prongs and an anchor formation for each prong; and bonding the elements together with the anchor formation sandwiched therebetween and with the prongs extending therefrom.

Preferably, the head is of a non-metallic material. It may conveniently be of a synthetic plastics material or of a fibrous material. In a preferred form, the disc-like elements are of a thermo plastic synthetic plastics material that are welded together.

The prongs are preferably of metal and may, for example, be of mild steel or brass.

The anchor formation of each prong may be a bent over end portion. The prongs may be separate or not. Thus, they may be parts of two separate strips or they may be parts of a single strip. In the latter case, the strip may be "T"-shaped with the prongs defining the leg thereof and a folded over central portion, which comprises the anchor formations, defining the cross bar thereof.

The invention may include the step of bending two separate strips to form the anchor formations and prongs or the step of forming the "T"-shaped binding member referred to above.

The binding member may be inserted in the aperture by displacing it perpendicularly towards the apertured element. Instead, an access slot, or slit, may be formed in the apertured element, the slot, or slit, extending from the aperture to the periphery of the element. The binding member may then be displaced in a sideways manner towards the aperture, with the member passing through the slot or slit to enter the aperture. In the case of a slit, the apertured element may be deformed to open the slit and thereby facilitate entry of the member therein and passage therethrough.

It will be appreciated that by "slit" is meant an incision in which material is not removed, and is formed, for example, by a shearing or cleaving action. If a slit is used, once the two elements are bonded together, the cut line is not very visible.

The head forming element may be parted from a strip that is supplied from a roll thereof.

The invention extends further to an apparatus for manufacturing a paper binder in accordance with the invention, the apparatus including an inserting means for inserting the binding member into an aperture in a base element such that the prongs project from one side of the base element and the anchor formations are positioned against the other side of the base element; and a bonding means for bonding a cover element to the base element with the anchor formation sandwiched therebetween.

The apparatus may include a binding member forming means for forming the prongs and anchor formations of the binding member.

The apparatus may also include an aperture forming means for forming the aperture in the base element.

A slot forming means may be provided for forming the access slot in the base element. Alternatively, a slit cutting means may be provided for cutting the access slit in the base element.

In order to part the base and cover elements from strips, the apparatus may also include a parting means.

The invention is now described, by way of examples, with reference to the accompanying drawings.

DETAILED DESCRIPTION OF THE DRAWINGS

Figure 1:
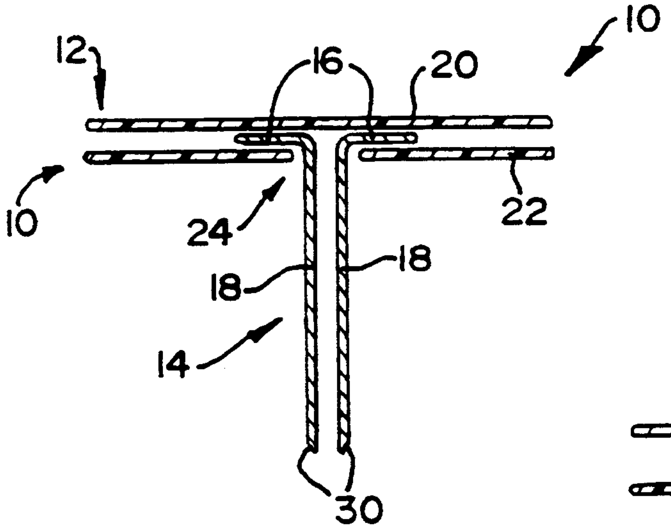
FIG. 1 shows a schematic sectioned view of a first embodiment of a paper binder in accordance with the invention.

Referring to FIG. 1, a paper binder in accordance with the invention is designated generally by reference numeral 10.

The binder 10 comprises a head 12 and a binding member 14 which extends from the head 12. The binding member 14 has two components, each of which defines a prong 18 and an anchor formation 16. As will be noted, the anchor formations 16 are bent over end portions.

The head 12 comprises two thin disc-like elements, there being a cover element 20 and a base element 22. These elements 20, 22 are of a fibrous material such as cardboard.

Figure 2:
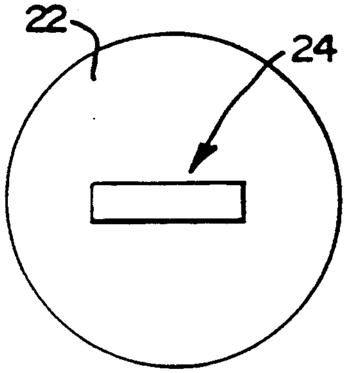
FIG. 2 shows a plan view of a thin base element which forms part of a head of the paper binder shown in FIG. 1.

As is seen in FIG. 2, the elements 20 and 22 are circular and the base element 22 has a centrally located, rectangular slot 24. The prongs 18 extend through the slot 24 with the anchor formations 16 being sandwiched between the cover element 20 and the base element 22. The cover element 20 and base element 22 are glued together with a suitable adhesive, thereby firmly holding the anchor formations 16 between them. Because the cover element 20 and base element 22 are of cardboard, and because the metal anchor formations 16 are embedded therein, the head 12 is not likely to scratch an exposed surface.

The prongs 18 are sharpened at their points 30.

Figure 3:
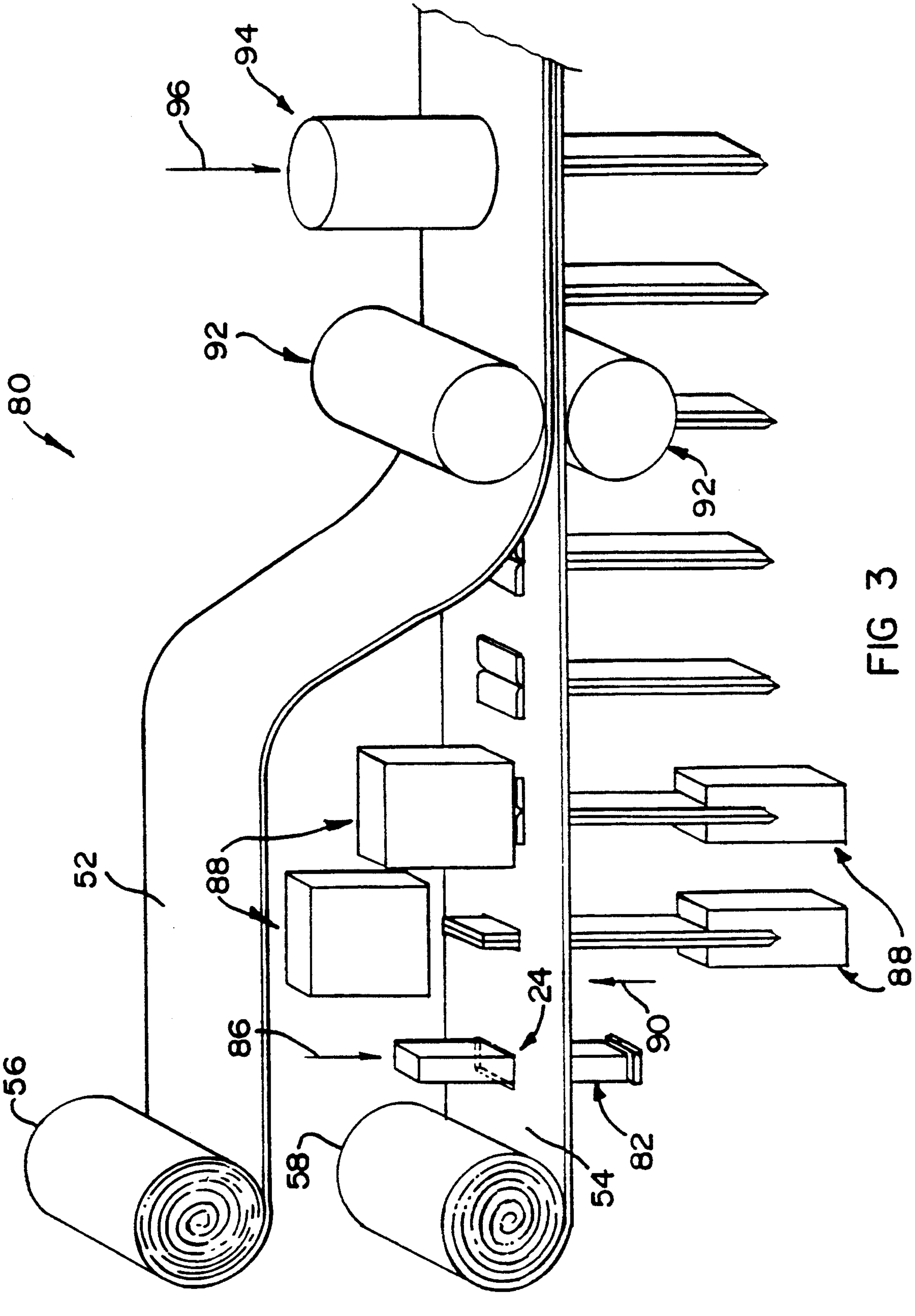
FIG. 3 shows schematically an apparatus for manufacturing the paper binder shown in FIG. 1 and illustrates the manner in which the binder is manufactured.

Referring to FIG. 3 an apparatus for manufacturing the paper binder 10 is indicated generally by reference numeral 80.

The apparatus 80 utilises an upper strip 52 and a lower strip 54 of cardboard which are drawn from rolls 56 and 58. Initially, the strips 52 and 54 are spaced apart.

A series of apertures 24 are formed sequentially in the lower strip 54 at the beginning of the manufacturing process, by means of a punch 82. The punch 82 is displaced perpendicularly to the strip 54, as indicated by arrow 86, to punch out an aperture 24 with each stroke.

Downstream of the punch 82 is a member inserting station at which the binding members 14 are inserted into the aperture 24, from below. The binding members 16 are held in an inserting tool 88 which moves upwardly to insert the upper ends of the binding member 14 into the aperture 24 and then moves horizontally, together with the strip 54. The end portions are bent over by a suitably shaped die 88.

The top strip 52 is then brought into contact with the lower strip 54, an adhesive is introduced between them by a roller or spray (not shown) and the two strips 52 and 54 are glued together by rollers 92 with the anchor formations 16 therebetween.

The elements 20 and 22 are then cut from the strips 52 and 54 by means of a punch 94 which is displaced perpendicularly to the strips 52 and 54 as shown by arrow 96.

Figure 4:
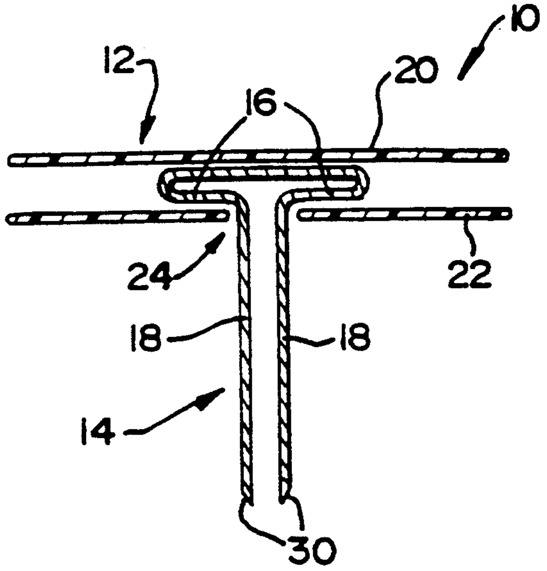
FIG. 4 shows a further embodiment of a paper binder in accordance with the invention.
Figure 5:
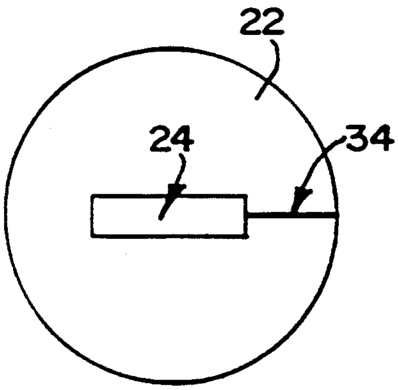
FIG. 5 shows a plan view of the base element used with the embodiment shown in FIG. 4.

Referring now to FIG. 4, a further embodiment of a paper binder in accordance with the invention is designated generally by reference numeral 32. This embodiment 32 is similar to the embodiment 10 shown in FIG. 1 and has similar reference numbers. However, with this embodiment 32 the cover element 20 and base element 22 are of PVC. The binding member 14 is also formed from one strip of mild steel which has a "T"-shape. The strip is bent to have the "T"-shape with the prongs 18 forming the leg of the "T" and a bent over central portion defining the cross bar thereof. The bent over central portion defines the anchor formations 16. Further, as is seen in FIG. 5, the base element 22 has a slit 34 which extends from one end of the aperture 24 to the periphery of the element 22. As will be described below, the binding member 14 is inserted into the aperture 24 in a sideways manner, via the slit 34.

Figure 6:
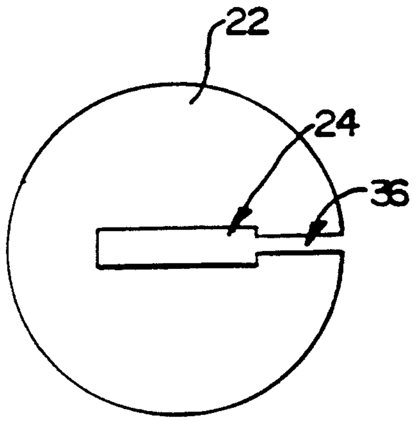
FIG. 6 shows a plan view of an alternative base element which may be used with the binder shown in FIG. 4.

Referring further to FIG. 6, it will be seen that the base element 22 could have a slot 36, rather than the slit 34.

The PVC elements 20 and 22 of the embodiment 32 are not glued together, but are welded together.

Figure 7:
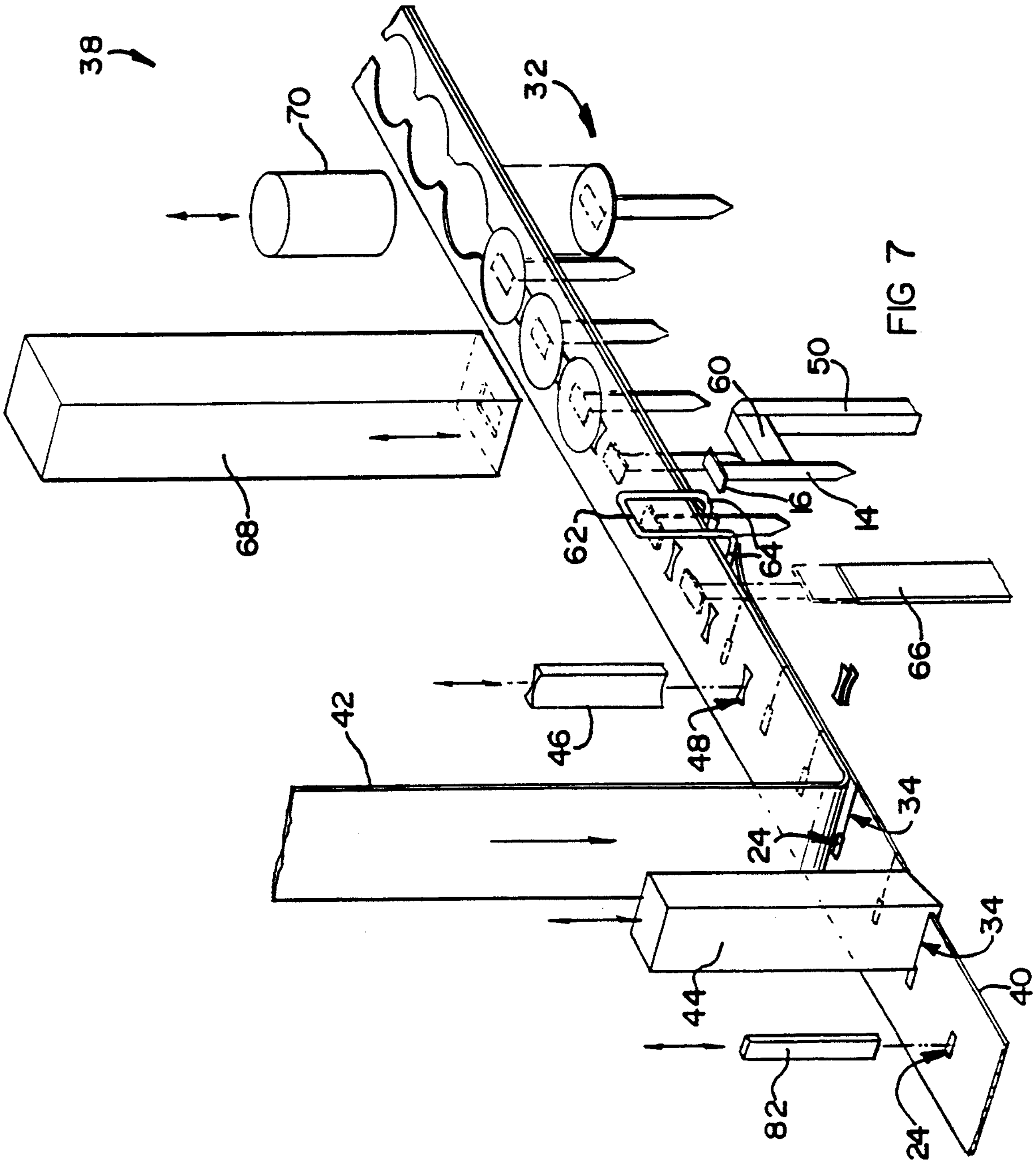
FIG. 7 shows schematically part of an apparatus for manufacturing the paper binder shown in FIG. 4.

Referring to FIG. 7, an apparatus for manufacturing the binder 32 is indicated generally by reference numeral 38.

As with the apparatus of FIG. 3, two strips, which are of PVC material, are utilized which are supplied from rolls (not shown). Thus, the apparatus 38 utilizes a lower strip 40 and an upper strip 42. As with the apparatus 80 of FIG. 3, the apparatus 38 has a punch 82 which punches the apertures 24. At the next station, the slit 34 is cut by mçans of a punch 44 which cleaves the lower strip 40 from the outside edge into the aperture 24. The upper strip 42 is then introduced from above so that it is in contact with and overlies the lower strip 40.

A further punch 46 then punches a "hour glass" opening 48 in both strips 40 and 42, midway between the apertures 24.

At the next station, the binding members 14 are inserted into the apertures 24 via the slits 34. The binding members 14 are inserted by means of an arm 50 which has a magnet 60 at its end. The magnet 60 takes a binding member 14 from a supply thereof and moves the member substantially transversely with respect to the strip 40 to locate the binding member 14 in the aperture 24 with the anchor formations 16 thereof sandwiched between the upper strip 42 and lower strip 40. The binding members 14 are formed in any suitable way. In order to facilitate insertion of the binding member into the aperture 24, a fork 62 is utilized. The fork 62 has prongs 64 which are positioned between the strips 40 and 42. It will be appreciated that the strips 40 and 42 are moved intermittently and the members 14 are inserted when the strips 40 and 42 are stationary. Thus, with the strips 40 and 42 stationary, the fork 62 is displaced downwardly, thereby opening the slit 34 and the arm 50 is then displaced to insert the binding member 14 in the aperture 24. When the binding member 14 is in position the fork 62 is lifted and a block 66 is raised. The arm 50 is then retracted. Because the slit 34 is closed and due to the presence of the block 66, return movement of the member 14 is impeded and it is stripped from the magnet 60.

At the next station, the material of strips 40 and 42 surrounding the anchor formations 16 and which subsequently define the elements 20 and 22, are welded together by means of an ultrasonic welding tool 68. Thus, the tool 68 is displaced downwardly into contact with the upper strip 42 and energised, thereby welding the material of the strips 40 and 42 together.

Subsequently, the elements 20 and 22 are parted from the strips 40 and 42 by a punch 70 which cuts two semicircles on either side of the openings 48 to form the circular elements 20 and 22. The resulting paper binder 32 then drops, under gravity, into a collecting bin (not shown) or the like.

By means of the invention, a paper binder is provided which is cheap and easy to manufacture and which is not likely to scratch exposed surfaces.

We claim:

1. A method of manufacturing a binder for binding sheet material, which method includes the steps of providing two thin head forming elements that are capable of being bonded together;

forming an aperture in one of the elements;

forming an access slot in said apertured element which extends from the aperture to the periphery of said apertured element;

inserting a binding member into the aperture, the member having a pair of prongs and an anchor formation for each prong; and bonding the elements together with the anchor formations sandwiched therebetween and with the prongs extending therefrom.

2. The method claimed in claim 1, in which the binding member is displaced towards said apertured element in a sideways manner to insert the binding member in the aperture via the slot.

3. A method of manufacturing a binder for binding sheet material, which method includes the steps of providing two thin head forming elements that are capable of being bonded together;

forming an aperture in one of the elements;

cutting an access slit in said apertured element which extends from the aperture to the periphery of said apertured element;

inserting a binding member into the aperture, the member having a pair of prongs and an anchor formation for each prong; and bonding the elements together with the anchor formations sandwiched therebetween and with the prongs extending therefrom.

4. The method claimed in claim 3, in which the binding member is displaced towards said apertured element in a sideways manner, said apertured element is deformed to open the slit, and the binding member is inserted into the aperture via the opened slit.

5. The method claimed in claim 1 or claim 3 in which said head forming elements are made from non-metallic materials.

6. The method claimed in claim 1 or claim 3 in which the binding member comprises two metal strips each having a bent over anchor formation at one end and a prong extending therefrom.

7. The method claimed in claim 1 or claim 3 which further includes the step of bending the binding member to form the anchor formations.

8. The method claimed in claim 1 or claim 3 in which the binding member comprises a single metal strip that is "T"-shaped, with the prongs defining the leg thereof and a central folded over portion defining the crossbar thereof.

9. The method claimed in claim 1 or claim 3 in which the elements are of a thermoplastic synthetic plastics material that are bonded together by welding.

* * * * *